Jan. 19, 1943.  E. D. VANCIL ET AL  2,308,728
SAFETY CONTROL FOR MACHINE TOOLS
Filed March 9, 1940  2 Sheets-Sheet 1

INVENTOR.
EDGAR D. VANCIL
WINTHROP TRIBLE
A. H. Parsons
ATTORNEY.

Patented Jan. 19, 1943

2,308,728

UNITED STATES PATENT OFFICE 2,308,728

SAFETY CONTROL FOR MACHINE TOOLS

Edgar D. Vancil and Winthrop Trible, Cincinnati Ohio, assignors to The Cincinnati Milling Machine Co., Cincinnati, Ohio, a corporation of Ohio Application March 9, 1940, Serial No. 323,176

15 Claims. (Cl. 90—21.5)

This invention relates to machine tools and more particularly to safety devices for protecting the cutting tool thereof.

One of the objects of this invention is to provide a machine tool with certain safety features which will reduce inadvertent operating actions that might cause damage to the tool, the work or any of the supports therefor.

Another object of this invention is to prevent the operator from accidentally feeding the cutter into some object other than the work carried by the work support and thereby causing permanent damage to the cutter or to the object.

A further object of this invention is to provide a safety device which will limit the depth of removable stock that can be fed to a cutter.

An additional object of this invention is to provide a shroud or guard for the tool of a metal working machine which will permit passage of work to the tool but which will prevent any parts which extend beyond the rough surface of the work, such as parts of a work fixture, from being inadvertently fed into engagement with the cutter.

Still another object of this invention is to provide certain interlocks whereby automatic stopping by a safety device also causes automatic reversal of the transmission thereby preventing the operator from inadvertently restarting the feed in the same direction.

Still another object of this invention is to provide an improved safety interlock control circuit for a machine tool.

Other objects and advantages of the present invention should be readily apparent by reference to the following specification, considered in conjunction with the accompanying drawings forming a part thereof and it is to be understood that any modifications may be made in the exact structural details there shown and described, within the scope of the appended claims, without departing from or exceeding the spirit of the invention.

Referring to the drawings in which like reference numerals indicate like or similar parts:

This invention deals with means for improving the safe operation of a machine tool whereby inadvertent relative movements between the cutter and work which might cause damage either to the cutter, the work, or the fixtures for holding the work may be prevented. Many of these mishaps occur during the process of setting up the machine for an automatic cycle, as for instance, in the case of where a work supporting fixture has portions extending above or beyond the rough surface of the work, and miscalculations result in these portions being fed into contact with the cutter. Again, in a productive cycle a work piece may be wrongly placed in a fixture, thereby presenting material for removal by the cutter which is beyond the capacity of the tool, thereby overburdening the cutter as well as spoiling a piece of work. Again, the feed rate of a machine is determined to a great extent on the amount of material to be removed per unit of time and a work piece, although correctly placed, might have an abnormal amount of removable stock on it which would jam the cutter and cause damage either to the cutter or to the working parts of the machine.

With the aid of the safety features of this invention the possibility of these various contingencies happening is greatly reduced.

In principle this invention contemplates providing a metallic shroud or guard around the tool of the machine, insulating the guard from the rest of the machine, and providing an electrical potential between the guard and the remainder of the machine whereby any moving part of the machine, including the work and supporting fixture therefor coming in contact with the guard, will complete an electrical circuit which will automatically render the actuating means producing the movement ineffective to continue the movement. Additionally, the reversing mechanism is actuated so that upon restarting the movement will be in a direction to break the contact. This guard is so contrived that it will permit passage of work having a predetermined amount of removable stock thereon to the cutter, but anything in excess of this amount will cause automatic stopping of the power actuated movement. It will be evident that this also applies in the case of any other upstanding abutment either on the work or on the fixture which would produce an overload on the cutter.

Figure 1:
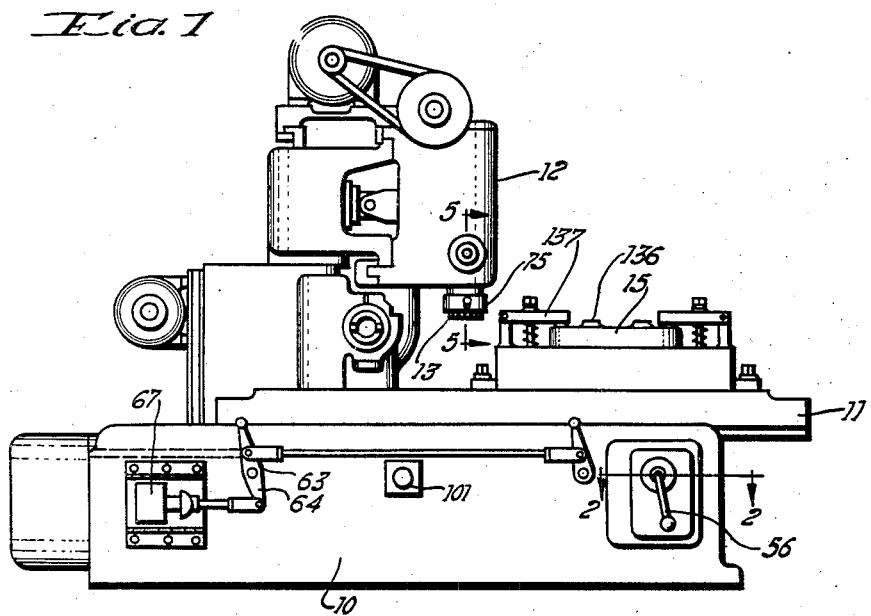
Figure 1 is a view in elevation of a machine tool embodying the principles of this invention.

Referring now to the drawings for the particular features of this invention, there is shown in Figure 1 a machine tool which is of the milling machine type because it illustrates the features of this invention to best advantage. This machine has a bed 10 which carries a table or work support 11, and a cutter or tool support 12. A tool 13 in the form of a milling cutter is attached to a spindle 14, Figure 5, which is rotatably mounted in the tool support. By securing a work piece, such as 15 to the table, and feeding the table to the left, as viewed in Figure 1, it will be obvious that material may be removed from the work.

Figure 6:
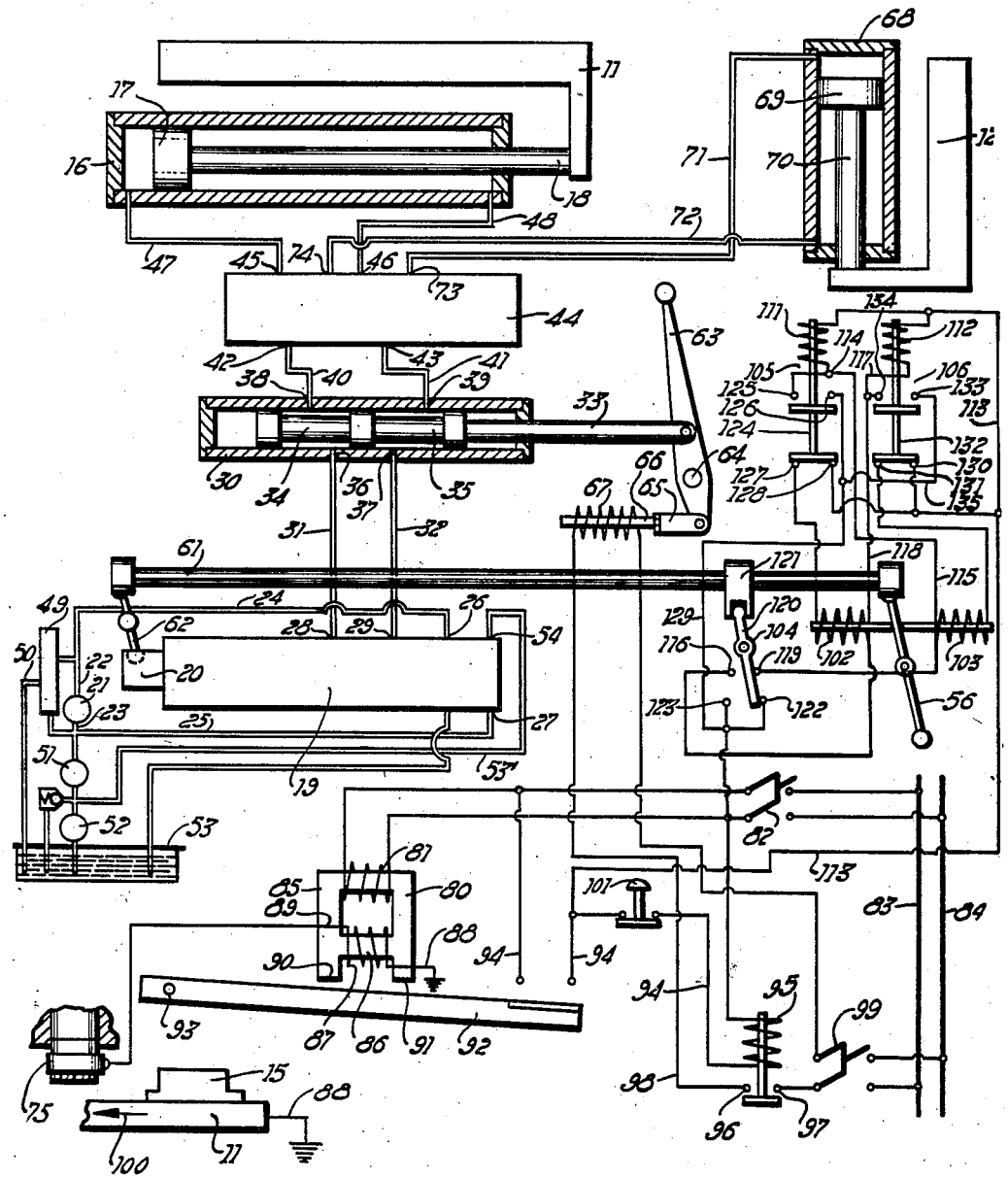
Figure 6 is a diagram of the control circuit.

The power means for effecting relative movement between the tool and work is illustrated, for exemplary purposes, as of the hydraulic type and consists of a hydraulic motor of the piston and cylinder type comprising a cylinder 16, Figure 6, which may be fixed or supported in the bed 10, and a contained piston 17 which is operatively connected by a piston rod 18 to the table 11 for effecting movement thereof.

A suitable form of hydraulic control circuit may be provided including a selector valve 19 having an axially and rotatably movable plunger 20 so drilled and ported that axial movement will change direction, and rotary movement will change rate as from feed to rapid traverse or vice versa. A feed pump 21 supplies pressure fluid for feeding purposes and is connected in a closed circuit manner to the selector valve. Thus, the pump has an intake port 22 and a delivery port 23 which are connected by channels 24 and 25 respectively to ports 26 and 27 of the selector valve. When the selector valve plunger is to the right, as shown, port 27 is connected to port 28 and port 26 is connected to port 29 whereby pressure fluid flows to the stop valve 30 through channel 31 and returns through channel 32.

The stop valve has a plunger 33 in which is formed annular grooves 34 and 35 for separately connecting ports 36 and 37 to ports 38 and 39. When the plunger 33 is shifted to the right to a stop position ports 38 and 39 are isolated and ports 36 and 37 are interconnected thereby short-circuiting the flow of fluid back to the pump.

The ports 38 and 39 are connected by channels 40 and 41 to ports 42 and 43 of a distributor valve 44. This valve has ports 45 and 46 which are connected by channels 47 and 48 to opposite ends of the cylinder 16. It will now be apparent that the feed pump operates to withdraw fluid from one end of the cylinder and pump it into the other end of the cylinder to effect movement. To compensate for piston differential on the cylinder 17 and to provide make-up oil the feed pump has a differential valve 49 connected across it to maintain a suitable pressure differential between lines 24 and 25 and insure discharge of excess fluid to reservoir through channel 50, while a booster pump 51 which is supercharged by a rapid traverse pump 52 from the reservoir 53 supplies make-up oil to channel 25 to maintain a suitable operating pressure therein.

The rapid traverse pump 52 is connected by channel 53 to port 54 of the selector valve, and when the valve is being utilized for feeding purposes this oil is by-passed to reservoir.

Figure 2:
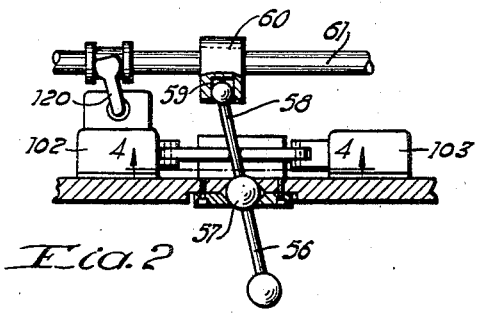
Figure 2 is a section on the line 2—2 of Figure 1.

The selector valve plunger 20 may be manually shifted to its various positions through a manual control lever 56 which is supported in the machine frame for universal movement by a ball 57 integral with the lever as shown in Figure 2. The lever also has a ball-shaped end 58 fitting in a socket 59 in a crank 60 which is attached to a shifter rod 61. The shifter rod is connected by universally movable lever 62 to the valve plunger 20. By moving lever 56 in the plane of the drawing as shown in Figure 2 the rod 61 will be shifted axially to effect axial movement of the selector valve plunger 20.

By moving lever 56 perpendicular to the plane of the drawing, the shifter rod 61 will be rotated, thereby causing rotation of the selector valve plunger 20. It will now be apparent that the operator may preselect the rate and direction of table movement by setting the manual control lever 56, and start and stop the movement of the table by shifting the stop valve plunger 33 by means of the manual control lever 63 which is connected thereto and pivotally supported at 64. The lower end of this lever is connected by a link 65 to an armature 66 of an electric solenoid 67. Energization of this solenoid will shift the stop valve to a stop position.

It may also be desirable to provide for movement of the tool support 12 transversely of the table and this may be accomplished hydraulically by providing a cylinder 68 having a contained piston 69 which is connected by a piston rod 70 to the tool support 12. The cylinder 68 is connected by channels 71 and 72 to ports 73 and 74 of the distributor valve 44. The distributor valve may be provided with any suitable means for transferring connections of ports 42 and 43 from the table motor ports 45 and 46, to ports 74 and 73 respectively. The particular construction of the distributor valve does not constitute any part of this invention and, therefore, the details thereof have not been illustrated herein.

It will be noted, however, that regardless of which slide is being moved by hydraulic pressure that shifting of the stop valve to a stop position will stop whichever slide is moving.

Figure 5:
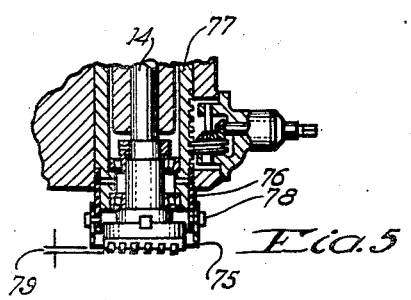
Figure 5 is a detail section on the line 5—5 of Figure 1.

Referring now to Figure 5, the cutter 13 is surrounded by a flexible metallic shroud plate 75 which is supported and electrically insulated from the rest of the machine by an insulating tube 76 which is attached to the quill 77.

The shroud plate 75 is connected to the insulator 76 by suitable screws 78 which pass through elongated holes in the shroud plate whereby the latter may be adjusted to vary the clearance between the end of the plate and the face of the cutter, this distance being indicated by the reference numeral 79. This distance indicates the cross sectional dimension of what may be defined herein as the cutting zone and above this zone is the protective zone. The above-mentioned dimension also indicates the maximum depth of material which may be fed to the cutter for removal thereby. Since the cutting zone lies parallel to the direction of feed of the table it will be obvious that anything carried by the table, whether work or fixture, and projecting through and above this zone will come into contact with the shroud plate if moved toward the cutter.

The means for creating an electrical potential difference between the shroud plate and the remainder of the machine consists of an induction relay 80 which has a primary coil 81, the ends of which are connected by a suitable switch 82 to power mains 83 and 84. The primary coil 81 is wound on one leg of a square core 85 and constitutes an exciting coil which sets up a magnetic flux which circulates through the lower leg 86 and back to the upper leg. The flux in the lower leg sets up a potential in a secondary coil 87 which may be known as a control coil. One end 88 of this coil is grounded to the frame of the machine and the other end 89 is connected to the shroud plate 75. Although this creates a potential between the shroud plate and the remainder of the machine no current actually flows.

The coil 87 and the leads therefrom to ground and to the plate constitutes a control circuit and when this circuit is closed by contact of some part of the machine with the plate a flow of current starts which produces a countermagnetic flux in the lower bar of the core and diverts the primary magnetic flux to the poles 90 and 91 which reacts on the armature 92 and forcibly draws the armature to the poles. The armature 92 is supported on a suitable pivot 93 and when actuated closes a circuit 94 to a relay coil 95. Energization of the relay coil closes contacts 96 and 97 of an independent circuit 98 to electrical solenoid 67, which as previously explained, has an armature 66 for shifting the stop valve plunger 33 to a stop position. This circuit is connected to the power mains 83 and 84 through switch 99.

Assuming the work piece 15 and supporting table 11 moved in the direction of arrow 100 as indicated in Figure 6 to establish contact with the ring 75, the action as explained thus far is that current will flow in coil 87 drawing armature 92, closing the circuit to relay coil 95, closing the circuit to solenoid 67, and thereby shifting the stop valve to a stop position.

Since the work piece 15 and table 11 really constitute part of the conductor 88, because it is to be understood that the entire machine is constructed of metal, the armature 92 cannot be released until this circuit is broken by moving the work piece 15 out of contact with the ring 75. Furthermore, the solenoid 67 is sufficiently strong to prevent manual manipulation of the control lever 63 to effect shifting of the stop valve to a running position.

Forcibly overcoming the solenoid to shift the stop valve would be futile because the table would again move in the direction of arrow 100 creating greater pressure between the work piece 15 and the ring 75. It should thus be obvious that it is necessary to change the direction of movement of the table and work before it becomes possible to break the contact between the work piece and the ring 75.

A push button 101 has been provided in the circuit 94 for breaking the circuit to relay 95 to effect de-energization of the solenoid 67. To insure that the operator does not operate this button and throw the stop valve lever 63 to a running position and cause further advance of the work piece toward the cutter, means are provided for automatically changing the position of the reverse valve plunger 20 and regardless of its former position so that when the operator does depress the button 101 and throw the lever 63 to a running position that the work and table will move in a direction opposite to that which caused the contact to be made.

The means for accomplishing this consists of a pair of solenoids 102 and 103 which are operatively associated with the control lever 56, a selector switch 104, and a pair of relays indicated generally by the reference numerals 105 and 106. The selector switch 104 works opposite to the position of lever 56 and shifter rod 61 in the sense that when the shifter rod is to the left, as viewed in Figure 6, the solenoid 103 is potentially connected for shifting the rod 61 to the right; and when the rod 61 is in a right hand position the switch potentially connects the solenoid 102 for operation to shift the rod to the left.

Figure 4:
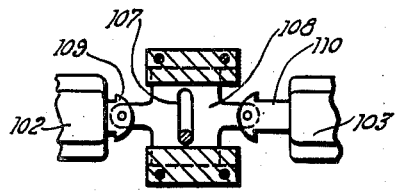
Figure 4 is a detail section on the line 4—4, of Figure 2.

As shown in Figure 4, the control lever 56 passes through an elongated hole 107 in plate 108 which is operatively connected to armatures 109 and 110 of solenoids 102 and 103. The elongated slot permits up and down movement of the lever 56 to effect rate changes. It makes it possible, however, for the plate to shift the lever regardless of its rate position.

The solenoids 102 and 103 are normally deenergized thereby, not interfering with the normal manual operation of the lever.

The relays 105 and 106 have operating coils 111 and 112 respectively which are connected by a common conductor 113, to circuit 94 which, in turn, is connected to the power line 83. The selector switch 104 determines which one of these relay coils will be energized when the armature 92 closes circuit 94. The terminal 114 of relay coil 111 is connected by conductor 115 to switch point 119 of the switch 104 and the terminal 117 of relay coil 112 is connected by conductor 118 to switch point 116 of switch 104. The switch 104 has a lever 120 which is operatively connected to the collar 121 of the shifter rod 61 and when the shifter rod is to the left the switch lever is positioned to connect point 119 to point 122 and thereby to power main 84. Since the switch point 116 is open at this time relay coil 112 will be de-energized while relay coil 111 will be energized. When the shifter rod 61 is in its other position the switch point 116 will be connected to point 123, and thus the power main 84 whereby relay coil 112 will be energized and relay 105 will not be energized.

With the parts in the position shown, the relay coil 111 will be energized and the armature 124 will move upward, as viewed in Figure 6, interconnecting switch contacts 125 and 126 and disconnecting normally closed contacts 127 and 128.

When the circuit is closed to line 113, current will flow through normally closed contacts 130 and 131 to relay coil 103. The other end of the relay is connected through closed contacts 119 and 122 to power main 84. It will be noted that current does not flow through relay coil 112 and solenoid 102 because of open contacts 116 and 123. Thus the selector switch determines which relay coil and solenoid will be energized upon closing of armature 92.

The closing of contacts 125 and 126 establishes a holding circuit for relay coil 111 and solenoid 103 through line 129. This is necessary because as soon as the shifter rod 61 moves, it breaks the connection between contacts 119 and 122. The holding circuit thus maintains the solenoid 103 energized until the shifting of rod 61 is completed.

The opening of contacts 127, 128 prevents energization of solenoid 102 by the closing of contacts 116 and 123 when the shift has been completed. It does not prevent, however, the energization of relay coil 112, the armature 132 of which now operates to close contacts 133, 134 establishing its holding circuit through lines 135 and 129 and opening contacts 130 and 131, breaking the circuit to solenoid 103.

The operator now presses button 101 with one hand and throws lever 63 with the other hand, causing the table to move away from the cutter, which breaks the circuit to the induction relay 80, whereby the armature 92 drops out breaking the circuit to relays 105 and 106. The relays are now restored to their normal position.

Figure 3:
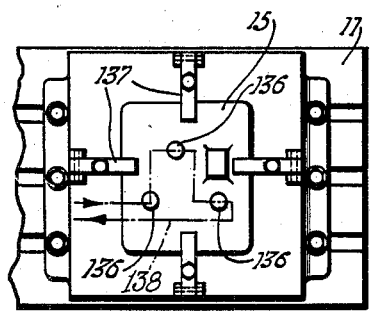
Figure 3 is a plan view of the work fixture.

This invention is very effective in machining work of the type shown in Figure 3 in which the work piece 15 has a series of bosses 136 to be machined. The work is secured to the table by hold-down clamps 137 which project above the plane of the finished surfaces of the bosses. The path of relative movement is illustrated by the dot and dash line 138. It will be obvious that any miscalculation in making these movements may cause engagement between the cutter and one of the clamps.

There has thus been provided an improved safety device for protecting the cutting tool of a machine tool from inadvertent engagement with parts extending above a predetermined cutting zone of the machine which would cause damage to the cutters or to the parts or both.

What is claimed is:

1. In a machine tool having a main frame, a tool support and a work support mounted on said frame for relative movement, a cutting tool mounted in said tool support and an actuator for effecting said movement, the combination of a protector for said cutter supported adjacent thereto, an electrical circuit having terminals connected to said frame and to said protector, means in said circuit for creating an electrical potential difference between said protector and the remaining parts of the machine whereby any relative movement effected by said actuator resulting in contact between the protector and any part of the machine will cause current to flow in said circuit, and means in the circuit responsive to said flow of current for rendering said actuator ineffective to cause further movement.

2. In a machine tool having a tool support, a work support and means connecting said supports, the combination with a tool mounted on the tool support, of a guard supported in shrouded relation to the tool but exposing a limited portion thereof for work engagement whereby a cutting zone and a protective zone are created, an actuator for propelling one of said supports relative to the other in a direction parallel to said zones whereby any portion of the work, support or parts carried thereby extending into the protective zone will engage said guard, and means responsive to said engagement to render said actuator propulsively ineffective.

3. In a machine tool having a tool support and a work support, the combination with a tool mounted on the tool support, of a guard surrounding said tool but providing a predetermined clearance to permit passage of work to the cutter, power operable means for feeding the work support and work past the guard to the cutter, electrical control means responsive to contact of any object or portion of an object carried by the work support with said guard to render said power operable means ineffective to produce further feeding movement.

4. In a machine tool having a tool support and a work support, the combination with a tool mounted in the tool support, of a metallic guard surrounding the tool but electrically insulated from the machine, an electrical control circuit having one terminal connected to said guard and the other terminal grounded in the machine, power operable means for feeding one of said supports relative to the other, and means in said circuit responsive to contact of the moving support or any part carried thereby with said guard to render said power operable means ineffective.

5. In a machine tool having a tool support and a work support, the combination with a cutting tool mounted on the tool support, of a flexible metallic guard supported adjacent to but insulated from the cutting tool, power operable means for effecting relative movement between the supports whereby a work piece may be fed past the cutter, a pilot control circuit having one terminal connected to the cutter support and the other to the guard whereby any part being moved by said power operable means and causing deflection of the guard into contact with the cutter support during the feeding movement will close said pilot circuit, and means actuated by said pilot circuit for rendering said power operable means ineffective.

6. In a machine tool having a tool support and a work support, the combination with a cutter mounted on the tool support, of a guard supported adjacent said cutter but electrically insulated therefrom, a pilot circuit having one terminal electrically connected to the work support and the other terminal electrically connected to the guard, power operable means for feeding the work support, and means responsive to closing of the circuit by contact of the work support or any part carried thereby with said guard for rendering said power operable means ineffective.

7. In a machine tool, the combination of a cutter support, a cutter mounted thereon, a work support confined to rectilinear movement, means electrically insulated from the machine and interposed between the cutter and the work support along the path of relative approach between the two, a pilot circuit having terminals connected to said means and to said supports whereby any object carried by the supports and contacting said means will close said circuit, actuating means for effecting relative movement between the supports, and means responsive to closing of said circuit for disabling said actuating means.

8. In a machine tool having a cutter support and a work support and a cutter mounted on said cutter support, the combination with means for effecting a relative feeding movement between said supports, of a guard surrounding said cutter and spaced a predetermined distance therefrom, said guard being of flexible metallic material, means insulating said guard from its support, an electrical control circuit having one terminal attached to said guard and the other terminal electrically connected to said supports whereby any deflection of the guard during relative movement between said supports by any part carried thereby will close said circuit, means responsive to closure of said circuit to stop the moving support, said guard being spaced a sufficient distance to permit overrun of the moving support without interference between the guard and the cutter.

9. In a machine tool having a tool carrier and a work carrier and unitary means for supporting said carriers, the combination with a tool mounted on the tool carrier, of a guard supported in shrouded relation to the tool but exposing a limited portion thereof for work passage whereby a cutting zone and a protective zone are created, an actuator for propelling one of said carriers toward the other whereby any portion of the work lying in the cutting zone will be removed by the cutter and any portion of the work lying in the protective zone will collide with said guard, and means responsive to said collision to render said actuator propulsively ineffective.

10. In a milling machine having a rotary cutter and a support therefor, the combination of a shroud plate surrounding said cutter, means for feeding work past said plate to the cutter, means for creating an electrical potential between the cutter and the plate including a control circuit, said plate being flexible whereby any bending of the plate during operation of the actuator will close said circuit and means responsive to the closing of said circuit to render said actuator ineffective.

11. In a milling machine having a rotary cutter, a support therefor, and a work support, the combination of a shroud plate for said cutter, an actuator for feeding the work support and work carried thereby past the cutter, means for adjusting said plate for determining the maximum thickness of material to be removed by the cutter, means to create an electrical potential between the plate and work whereby a work piece having removable material exceeding said maximum depth will engage said plate and close said circuit, and electrical responsive means in said circuit for disabling said actuator.

12. In a milling machine having a cutter support, a rotary cutter mounted thereon and a work support, the combination of a source of power, motion transmitting means coupling said source of power for relative movement between said supports, said motion transmitting means including reversing means and stop means, a protecting guard for said cutter, means to create an electrical potential between said guard and said supports including a control circuit, and means in said circuit responsive to energization thereof to actuate said stop means and said reversing means whereby the source of power is disconnected from the moving support and the reversing means is preset for a new direction of movement.

13. In a milling machine having a work support, a tool support and a cutting tool mounted on the tool support, the combination with means for effecting relative movement between the supports including reversing means, of a protector for said cutter, said protector having an electrical potential difference with respect to the remainder of the machine and means responsive to a grounding contact with said protector for actuating said reversing means.

14. In a milling machine having a work support, a tool support and a cutting tool mounted on the tool support, the combination with power operable means for effecting relative movement between the supports including reversing means and stop means, of a protector for said cutting tool, means for creating an electrical potential between said protector and the machine, and means responsive to any grounding of the protector with the machine for simultaneously actuating said reversing means and said stop means.

15. In a machine tool having a tool support, a tool mounted thereon, and a work support, the combination of a source of power, means coupling said source of power for relative movement between said supports including reversing means and stop means, a protective guard for said tool, a control circuit terminating in said guard and said supports respectively, means in said circuit to create an electrical potential between the guard and supports, a solenoid for operating said reversing means, a pilot relay therefor, a relay operable upon closing of said control circuit to energize said pilot relay and thereby effect operation of said solenoid, said reversing means including a two-position control lever, separate solenoids for shifting said lever to its respective positions, control relays for each solenoid, means connecting said control relays in parallel with said pilot relay including a selector switch operable by said lever whereby only one of said relays is connected in parallel with said pilot relay for simultaneous operation therewith, said selection being such that the lever is always operated upon energization of the control circuit, and manually operable switch means in the pilot relay control circuit for opening said circuit to permit manual operation of the solenoid operated stop means.

EDGAR D. VANCIL.
WINTHROP TRIBLE.